US012760182B2

(12) United States Patent
Yamada et al.

(10) Patent No.: US 12,760,182 B2
(45) Date of Patent: Oct. 13, 2026

(54) CARBON BLACK, INK, COATING COMPOSITION, COLORING AGENT FOR PLASTICS, COLORED MOLDED ARTICLE, COLORING AGENT FOR STATIONERY AND WRITING INSTRUMENTS, TEXTILE PRINTING AGENT, TONER, DISPERSION OR RESIST FOR COLOR FILTERS, AND COSMETIC COMPOSITION

(71) Applicant: DIC Corporation, Tokyo (JP)

(72) Inventors: Shogo Yamada, Kamisu (JP); Akira Kimura, Kamisu (JP)

(73) Assignee: DIC CORPORATION, Tokyo (JP)

( * ) Notice: Subject to any disclaimer, the term of this patent is extended or adjusted under 35 U.S.C. 154(b) by 545 days.

(21) Appl. No.: 18/274,915

(22) PCT Filed: Dec. 16, 2021

(86) PCT No.: PCT/JP2021/046424
§ 371 (c)(1),
(2) Date: Jul. 28, 2023

(87) PCT Pub. No.: WO2022/176363
PCT Pub. Date: Aug. 25, 2022

(65) Prior Publication Data

US 2024/0084146 A1 Mar. 14, 2024

(30) Foreign Application Priority Data

Feb. 18, 2021 (JP) ................................ 2021-024127

(51) Int. Cl.
*C09C 1/48* (2006.01)
*C09C 1/00* (2006.01)
*C09D 11/324* (2014.01)

(52) U.S. Cl.
CPC .............. *C09C 1/48* (2013.01); *C09C 1/0081* (2013.01); *C09D 11/324* (2013.01); *C01P 2002/70* (2013.01); *C01P 2006/90* (2013.01)

(58) Field of Classification Search
CPC ........... C09C 1/48; C09C 1/0081; C08K 3/08; C09D 11/324
See application file for complete search history.

(56) References Cited

U.S. PATENT DOCUMENTS

| | | | | |
|---|---|---|---|---|
| 5,919,294 | A | 7/1999 | Hirasa et al. | |
| 2014/0296413 | A1* | 10/2014 | Miyazaki | C08L 7/00 524/526 |
| 2016/0190594 | A1* | 6/2016 | Honma | C09C 1/565 252/511 |
| 2020/0291237 | A1 | 9/2020 | Hardman et al. | |

FOREIGN PATENT DOCUMENTS

| | | | |
|---|---|---|---|
| JP | 54-163927 | A | 12/1979 |
| JP | 60-20971 | A | 2/1985 |
| JP | 60-38472 | A | 2/1985 |
| JP | 6-136287 | A | 5/1994 |
| JP | 10-17808 | A | 1/1998 |
| JP | 2003-201419 | A | 7/2003 |
| JP | 2005-113091 | A | 4/2005 |
| JP | 2014-152195 | A | 8/2014 |
| JP | 2014-201607 | A | 10/2014 |
| JP | 2017-8223 | A | 1/2017 |

OTHER PUBLICATIONS

Wang et al. "Effect of the Pre-Treatment of Carbon Black Supports on the Activity of Fe-Based Electrocatalysts for the Reduction of Oxygen," J. Phys. Chem. B 1999, 103, 2042-2049. (Year: 1999).*
T. Asakawa and K. Ogino. "Adsorption of Phenol on Surface-Modified Carbon Black from Its Aqueous Solution ," J. Colloidal Interface Science, 1984, 102(2), 348-355. (Year: 1984).*
Abussaud et al. "Sorption of phenol from waters on activated carbon impregnated with iron oxide, aluminum oxide and titanium oxide," J. Molec. Liq. 2016, 213, 351-359. (Year: 2016).*
International Search Report dated Mar. 15, 2022, issued in counterpart International Application No. PCT/JP2021/046424 (3 pages).

* cited by examiner

*Primary Examiner* — Paul A Wartalowicz
*Assistant Examiner* — Nicholas A. Piro
(74) *Attorney, Agent, or Firm* — WHDA, LLP

(57) ABSTRACT

An object of the present invention is to provide a carbon black, an ink, and the like having excellent dispersion stability. A carbon black of the present invention includes iron element in an amount of 0.01 to 2.00 parts by mass per 100 parts by mass of the carbon black. Preferably, a ratio of Fe/C is 0.001 to 0.010, where Fe is a concentration in atomic % of the iron element on a surface of particles of the carbon black, and C is a concentration in atomic % of elemental carbon on the surface of the particles of the carbon black, as determined by X-ray photoelectron spectroscopy.

13 Claims, No Drawings

CARBON BLACK, INK, COATING COMPOSITION, COLORING AGENT FOR PLASTICS, COLORED MOLDED ARTICLE, COLORING AGENT FOR STATIONERY AND WRITING INSTRUMENTS, TEXTILE PRINTING AGENT, TONER, DISPERSION OR RESIST FOR COLOR FILTERS, AND COSMETIC COMPOSITION

TECHNICAL FIELD

The present invention relates to a carbon black and also relates to an ink, a coating composition, a coloring agent for plastics, a colored molded article, a coloring agent for stationery and writing instruments, a textile printing agent, a toner, a dispersion or resist for color filters, and a cosmetic composition that include the carbon black.

BACKGROUND ART

For a long time, carbon blacks have been mainly used as a reinforcing agent that is added to rubber products, such as tires. Other uses of carbon blacks include those in black coloring agents that are used in inks, coating compositions, toners, cosmetics, plastic colorant, and the like. Among these, printing applications such as those in inks (in particular, printing inks and ink jet inks) are important. Regarding the ink applications, the degree of blackness and the coloring power of carbon blacks are important. Carbon blacks having smaller particle sizes have higher degrees of blackness and higher coloring powers. However, since carbon blacks having a small particle size have a strong interparticle attractive force because of the increased surface area of the particles of the carbon black, dispersion stability deteriorates, which results in an increase in viscosity during the storage of the ink. Accordingly, improving the dispersion stability of carbon blacks is essential. Poor dispersion stability leads to an increase in viscosity during the storage of the ink and is, therefore, a major factor that causes poor printability, which may involve, for example, a failure to produce a coating having a designed coating thickness. In some instances, the carbon black precipitates during storage, and, consequently, the ink can no longer be used.

For example, Patent Literature 1 describes a carbon black in which a sum B of contents of chromium, cobalt, and nickel and a content R of iron element are both within a range of 0.1 ppm to 100 ppm, and the ratio (B/R) is greater than or equal to a specified value. Furthermore, Patent Literature 2 describes a method for surface-treating a carbon black including irradiating a pigment with ultrasonic waves in an aqueous solution of hydrogen peroxide, an ozone water, or water in which hydrogen peroxide and ozone are dissolved.

CITATION LIST

Patent Literature

PTL 1: Japanese Unexamined Patent Application Publication No. 6-136287
PTL 2: Japanese Unexamined Patent Application Publication No. 2003-201419

SUMMARY OF INVENTION

Technical Problem

The carbon blacks produced according to either of Patent Literature 1 and 2 have insufficient dispersion stability, and, therefore, there is a need for a carbon black having higher dispersion stability, for uses in inks and the like. Accordingly, an object of the present invention is to provide a carbon black, an ink, and the like having excellent dispersion stability.

Solution to Problem

The present inventors diligently conducted studies to improve the dispersion stability of carbon blacks and, consequently, conceived of including a specified amount of iron element in a carbon black, which is an idea that has not been conceived of in the related art. Patent Literature 1 discloses that a metal component such as iron is intentionally added to control a color. The disclosure, however, does not address the dispersion stability of the carbon black. Furthermore, the content of iron element in the carbon black of the present invention is an amount that cannot be conceived of from Patent Literature 1. Patent Literature 2 addresses the dispersion stability of the carbon black. However, the disclosure relates to irradiating a pigment with ultrasonic waves under specified conditions and does not disclose the inclusion of iron element. Details of the studies made in the present invention are as follows.

A carbon black is composed of aggregates (primary masses), which are masses of spherical primary particles fused together, and agglomerates (secondary masses), which are masses of the aggregates formed by intermolecular interaction. Disintegrating the aggregates into primary particles is difficult, and, therefore, in instances where a carbon black is used as an ink, the carbon black is dispersed in a solvent in the aggregated state. However, if the carbon black is dispersed in a solvent alone, the aggregates of the carbon black rapidly form masses to reform agglomerates. Hence, producing an ink having good dispersion stability requires additionally using a polymer, such as a binder resin or a dispersing agent, to form a dispersion network made of the carbon black, the solvent, and the polymer. Accordingly, it is necessary to adsorb the polymer onto the carbon black via intermolecular interaction. A type of intermolecular interaction is van der Waals forces. The van der Waals forces are forces that can act even between neutrally charged molecules. However, the interaction is weak and, therefore, cannot be expected to act to achieve stable adsorption of the polymer. Accordingly, attention was paid to ionic bonding and hydrogen bonding, which are stronger types of intermolecular interaction. Typically, polymers that are used in inks include a functional group capable of ionic bonding or hydrogen bonding, because such functional groups can be expected to be adsorbed onto the carbon black. Accordingly, an approach that can be taken is to provide, to a surface of the particles of the carbon black, a certain functional group that forms an ionic bond or a hydrogen bond. In this regard, utilizing a metal oxide was contemplated. Metal oxides have a hydroxy group on an outer peripheral portion and are, therefore, capable of hydrogen bonding. Furthermore, in particular, the hydroxy group of polyvalent metal oxides have amphoteric properties and are, therefore, able to accept both an acid and a base. Consequently, such hydroxy groups are expected to form an ionic bond with a polymer in various ink systems. For the utilization of the hydroxy group of a polyvalent metal oxide, the step chosen was to treat the surface of the particles of the carbon black with an iron oxide. The selection of iron was made because iron, among many other polyvalent metals, is inexpensive and not hazardous.

Specifically, the present invention relates to the following items.

Item 1. A carbon black including iron element in an amount of 0.01 to 2.00 parts by mass per 100 parts by mass of the carbon black.

Item 2. The carbon black according to Item 1, wherein a ratio of Fe/C is 0.001 to 0.010, where Fe is a concentration in atomic % of the iron element on a surface of particles of the carbon black, and C is a concentration in atomic % of elemental carbon on the surface of the particles of the carbon black, as determined by X-ray photoelectron spectroscopy.

Item 3. The carbon black according to Item 1 or 2, wherein the carbon black has an acid adsorption amount per surface area of 0.40 μmol/$m^2$ or greater.

Item 4. An ink including the carbon black according to any one of Items 1 to 3.

Item 5. A coating composition; a coloring agent for a plastic; a colored molded article; a coloring agent for stationery and a writing instrument; a textile printing agent; a toner; a dispersion or resist for a color filter; and a cosmetic composition, wherein the coating composition, the coloring agent for a plastic, the colored molded article, the coloring agent for stationery and a writing instrument, the textile printing agent, the toner, the dispersion or resist for a color filter, and the cosmetic composition include the carbon black according to any one of Items 1 to 3.

Advantageous Effects of Invention

Carbon blacks of the present invention have excellent dispersion stability and low viscosity. Accordingly, the carbon blacks of the present invention are suitable for inks (in particular, printing inks and ink jet inks). Furthermore, the carbon blacks of the present invention can also be used in various applications other than ink applications. Examples of the applications include those in coating compositions, coloring agents for plastics, coloring agents for stationery and writing instruments, textile printing agents, toners, dispersions or resists for color filters, and cosmetic compositions.

DESCRIPTION OF EMBODIMENTS

The present invention will be described in detail below.

[Carbon Black of Present Invention]

A carbon black of the present invention is one in which a typical carbon black, that is, carbon-based fine particles, includes a specified amount of iron element. The carbon black of the present invention includes iron element in an amount of 0.01 to 2.00 parts by mass (1,000 to 20,000 ppm) per 100 parts by mass of the carbon black. The content of the iron element is preferably 0.05 to 1.80 parts by mass and more preferably 0.3 to 1.50 parts by mass. When the content of the iron element is within any of the mentioned ranges, an ink including the carbon black has excellent dispersion stability and low viscosity. The content of the iron element can be measured, for example, with an energy dispersive X-ray fluorescence analyzer.

The iron element is not limited to metallic iron (Fe) and may be in the form of an iron compound, examples of which include iron oxides (e.g., FeO and $Fe_2O_3$) and iron hydroxides (e.g., $Fe(OH)_2$ and $Fe(OH)_3$). Regarding the above-mentioned content of the iron element, even in the case where an iron compound is used, the amount of the iron element thereof can be measured. Simply mixing metallic iron or an iron compound with the carbon black results in incorporation of the metallic iron and the iron compound into an interior of the aggregates (primary masses), and, therefore, such simple mixing cannot contribute to the dispersion stability. In the present invention, "inclusion of iron element (iron)" means the presence of iron element (iron) on a surface of the aggregates of the carbon black. In this state, the iron element (iron) causes interaction between the aggregates of the carbon black, and, therefore, the iron element affects the physical properties of the carbon black and, in addition, affects the physical properties of inks including the carbon black.

A ratio of Fe/C is, for example, 0.001 to 0.010, where Fe is a concentration in atomic % of the iron element on a surface of the particles of the carbon black, and C is a concentration in atomic % of elemental carbon on the surface of the particles of the carbon black, as determined by X-ray photoelectron spectroscopy. The Fe/C is preferably 0.002 to 0.008 and more preferably 0.003 to 0.006. When the Fe/C is within any of the mentioned ranges, an ink including the carbon black has excellent dispersion stability and low viscosity. The Fe/C can be measured, for example, with an X-ray photoelectron spectrometer.

The carbon black has a particle size of 5 to 200 nm, for example. Preferably, the particle size is 20 to 50 nm. The carbon black has a nitrogen adsorption specific surface area (BET) of 20 to 500 $m^2$/g, for example. Preferably, the nitrogen adsorption specific surface area is 30 to 150 $m^2$/g. The carbon black has a DBP oil absorption of 20 to 150 $cm^3$/100 g, for example. Preferably, the DBP oil absorption is 30 to 120 $cm^3$/100 g. The carbon black has a volatile matter content of 0.1 to 10.0%, for example. The carbon black has a pH value of 1 to 10, for example. Preferably, the pH value is 2 to 9.

Preferably, the carbon black of the present invention has an acid adsorption amount per weight of 10.0 μmol/g or greater (e.g., 10.0 to 100 μmol/g). The acid adsorption amount is more preferably 15.0 to 80 μmol/g and particularly preferably 20.0 to 60 μmol/g. When the acid adsorption amount per weight is within any of the mentioned ranges, the carbon black sufficiently adsorbs a binder resin having an acid number, such as an acrylic resin. As a result, steric hindrance acts to maintain a distance between the particles of the carbon black, and, consequently, the dispersion stability is improved. Furthermore, protons received from a solvent, such as an alcohol, or from water present in an ink cause the surface of the particles of the carbon black to become positively charged. As a result, an electrostatic repulsion effect also acts to maintain a distance between the particles of the carbon black, and, consequently, the dispersion stability is improved. The acid adsorption amount per weight can be measured as follows. The carbon black is immersed in an acid adsorption liquid to adsorb the acid onto the carbon black, and subsequently, an amount of the acid remaining in the acid adsorption liquid is determined by titration.

Preferably, the carbon black of the present invention has an acid adsorption amount per surface area of 0.40 μmol/$m^2$ or greater (e.g., 0.40 to 2.0 μmol/$m^2$). The acid adsorption amount is more preferably 0.42 to 1.0 μmol/$m^2$ and particularly preferably 0.43 to 0.9 μmol/$m^2$. When the acid adsorption amount per surface area is within any of the mentioned ranges, the carbon black sufficiently adsorbs a binder resin having an acid number, such as an acrylic resin. As a result, steric hindrance acts to maintain a distance between the particles of the carbon black, and, consequently, the dispersion stability is improved. Furthermore, protons received from a solvent, such as an alcohol, or from water present in an ink cause the surface of the particles of the carbon black to become positively charged. As a result, an electrostatic repulsion effect also acts to maintain a distance between the particles of the carbon black, and, consequently, the dispersion stability is improved. The acid adsorption amount per surface area can be calculated by dividing the acid adsorption amount per weight by the nitrogen adsorption specific surface area, which is measured with a specific surface area measuring apparatus.

Preferably, the carbon black of the present invention has a base adsorption capacity per weight of 10.0 μmol/g or greater (e.g., 10.0 to 200 μmol/g). The base adsorption capacity is more preferably 12.0 to 150 μmol/g and particularly preferably 15.0 to 100 μmol/g. When the base adsorption capacity per weight is within any of the mentioned ranges, the carbon black sufficiently adsorbs a binder resin having an amine number, such as a polyurethane resin. As a result, steric hindrance acts to maintain a distance between the particles of the carbon black, and, consequently, the dispersion stability is improved. The base adsorption capacity per weight can be measured as follows. The carbon black is immersed in a base adsorption liquid to adsorb the base onto the carbon black, and subsequently, an amount of the base remaining in the base adsorption liquid is determined by titration.

Preferably, the carbon black of the present invention has a base adsorption capacity per surface area of 0.10 μmol/$m^2$ or greater (e.g., 0.10 to 2.0 μmol/$m^2$). The base adsorption capacity is more preferably 0.20 to 1.0 μmol/$m^2$ and particularly preferably 0.30 to 0.9 μmol/$m^2$. When the base adsorption capacity per surface area is within any of the mentioned ranges, the carbon black sufficiently adsorbs a binder resin having an amine number, such as a polyurethane resin. As a result, steric hindrance acts to maintain a distance between the particles of the carbon black, and, consequently, the dispersion stability is improved. The base adsorption capacity per surface area can be calculated by dividing the base adsorption capacity per weight by the nitrogen adsorption specific surface area, which is measured with a specific surface area measuring apparatus.

[Method for Producing Carbon Black]

The carbon black of the present invention can be produced, for example, by treating a typical commercial carbon black with a specific treatment. Firstly, a commercial carbon black is prepared. The carbon black that is the raw material to be used is not particularly limited and may be any of a variety of commercial products produced by a contact method, a furnace method, a thermal method, or the like. Examples of the carbon black include oil furnace blacks, gas furnace blacks, channel blacks, and acetylene blacks.

Examples of the commercial carbon black include MA series, including 7, 8, 11, 77, 100, 100R, 100S, 220, 230, and 600, #650, #750, #40, #44B, #44, #45B, #47, #45, #33, #45L, #47, #50, #52, #2700, #2650, #2600, #200, #2350, #2300, #2200, #1000, #990, #980, #970, #960, #950, #900, #850, #32, #30, #25, #20, #10, #5, CF9, #95, and #260 (all manufactured by Mitsubishi Chemical Corporation); Special Black series, including 6, 5, 4A, 4, 101, 550, 350, 250, and 100, Printex series, including U, 150T, V, 140V, and 140U, PrinteX series, including P, L6, L, G, ES23, ES22, A, 95, 90, 85, 80, 75, 60, 55, 45, 40, 35, 300, 30, 3, 25, and 200, and Color Black series, including S170, S160, FW2V, FW200, FW2, FW18, and FW1 (all manufactured by Orion Engineered Carbons); Black Pearls series, including 1000M, 800, 880, and 4630, Monarch series, including 1300, 700, 880, and 4630, Regal series, including 330R, 660R, 660, 400R, 415R, and 415, and Mogul series, including E and L (all manufactured by Cabot Corporation); Raven series, including 7000, 3500, 5250, 5750, 5000ULTRAII, 1255, 1250, 1190, 1000, 1020, 1035, 1100ULTRA, 1170, and 1200 (all manufactured by Columbian Chemicals Company); Sunblack (SB) series, including 200, 210, 220, 230, 240, 250, 260, 270, 280, 300, 305, 320, 400, 410, 600, 700, 705, 710, 715, 720, 725, 805, 900, 910, 935, and 960 (all manufactured by Asahi Carbon Co., Ltd.); and Tokablack series, including #8500, #8500F, #7550SB, and #7550F (all manufactured by Tokai Carbon Co., Ltd.).

Next, the carbon black that is the raw material is added to a solvent to wet the carbon black with the solvent. The solvent may be water and/or an organic solvent. Examples of the organic solvent include methanol, ethanol, n-propanol, and i-propanol. In particular, water is preferable from an economic standpoint. The water may be purified water or industrial water. In addition, a buffered solution may be used, and examples of the buffered solution include acetate buffers, phosphate buffers, citrate buffers, citrate phosphate buffers, borate buffers, and tartrate buffers. Furthermore, one or more additives such as a surfactant may be additionally used to promote wetting. Preferably, an amount of addition of the carbon black that is the raw material is 1 to 30 parts by mass per 100 parts by mass of the solvent. If the amount of addition is small, productivity is reduced, and if the amount of addition is large, the slurry becomes highly viscous, and, consequently, an excessive amount of energy is necessary for stirring. Accordingly, the amount of addition is more preferably 2 to 20 parts by mass and particularly preferably 3 to 12 parts by mass.

Subsequently, the treatment is carried out by adding an iron compound and an oxidizing agent and then performing stirring. Examples of the iron compound include iron sulfate, iron chloride, iron fluoride, iron bromide, iron iodide, iron nitrate, iron phosphate, iron borate, iron carbonate, and iron acetate. Iron sulfate, iron chloride, and iron nitrate are preferable from an economic standpoint. The iron may be divalent or trivalent iron. The iron compound may be an anhydride or a hydrate. The iron compound is added, for example, in an amount of 1 to 30 parts by mass and, preferably, 3 to 20 parts by mass, with respect to the amount of the carbon black that is the raw material.

Examples of the oxidizing agent include hydrogen peroxide, permanganate salts, hypochlorous acid, chlorous acid, chloric acid, perchloric acid, peroxodisulfate salts, chromic acid, dichromic acid, and ozone. In particular, preferably, the oxidizing agent is hydrogen peroxide diluted with water to a concentration of 20 to 50 mass %. An amount of use of the oxidizing agent may be any amount suitable for an oxidation reaction and may vary depending on a concentration. The amount is, for example, 10 to 100 parts by mass and, preferably, 20 to 80 parts by mass, per 100 parts by mass of the carbon black. A temperature for the carbon black slurry production step and the surface treatment step is preferably 0° C. to 100° C. and more preferably 20° C. to 80° C., for example. The iron compound and the oxidizing agent may be added to the carbon black slurry simultaneously or separately. In instances where the iron compound and the oxidizing agent are added simultaneously, the iron compound and the oxidizing agent may be mixed together in advance and then added. In instances where the iron compound and the oxidizing agent are added separately, the iron compound may be added first, or the oxidizing agent may be added first. Furthermore, the oxidizing agent may be added dropwise or at one time.

As described above, it is preferable that the production of the carbon black of the present invention be carried out as follows: in a state in which the carbon black and the iron compound coexist, the iron is oxidized with the oxidizing agent so that the surface of the particles of the carbon black can be treated with an iron oxide. Iron compounds and oxidizing agents are both inexpensive compounds and, therefore, are economically advantageous. Since the reaction is complex, it is difficult to identify the type of the compound formed from the iron. It is presumed that the compound is an iron oxide or an iron oxyhydroxide.

If necessary, the carbon black produced as described above may be subjected to one or more typical treatments, such as pH adjustment, filtration, water washing, drying, and grinding. The carbon black of the present invention may include a dispersing agent and/or a surfactant added thereto to improve dispersibility.

[Ink]

An ink of the present invention is not particularly limited as long as the ink includes the carbon black of the present invention. The ink of the present invention can be used in a variety of applications, such as offset printing, gravure printing, flexographic printing, screen printing, and ink-jet-process printing. The ink of the present invention has low viscosity and excellent pigment dispersibility and transparency because the ink includes the carbon black of the present invention. Accordingly, the ink of the present invention is suitable for use as an offset lithographic ink for offset lithographic printing, a liquid ink that can be used in gravure printing and flexographic printing, and an ink jet ink.

Offset inks are inks for lithographic printing (lithographic printing that uses a fountain solution and waterless lithographic printing, which does not use a fountain solution), relief printing, intaglio printing, stencil printing, and various printing processes involving a transfer (offset) process in which the ink applied to a printing plate of any of the foregoing types of printing is transferred to an intermediate transfer medium, such as a blanket, and thereafter, the transferred ink is printed on a printing medium.

The offset lithographic ink includes the carbon black of the present invention and further includes other components, examples of which include resin varnishes, organic solvents, oils and/or fats, such as animal or vegetable oils, and auxiliary agents (drying inhibitors, dryers, abrasion resistance improvers, and the like). The offset lithographic ink is produced by appropriately mixing these components together and then milling and dispersing the components in a roll mill or the like. The ink that can be used in offset lithographic printing is an ink having a relatively high viscosity of 5 to 100 Pa·s.

Examples of the resin to be used in the resin varnishes include rosin-modified phenolic resins, petroleum resins, petroleum-resin-modified rosin-modified phenolic resins, alkyd resins, rosin esters, vegetable-oil-modified rosin-modified phenolic resins, vegetable-oil-modified rosin esters, polyesters, and acrylic resins. Examples of the organic solvent include solvents typically used in inks, such as hydrocarbon-based, alcohol-based, ester-based, or ketone-based solvents.

Liquid inks are used as gravure inks and flexographic inks and are generally classified into organic solvent-type liquid inks, which include an organic solvent as a major solvent, and aqueous liquid inks, which include water as a major solvent. The carbon black of the present invention can be used in both organic solvent-type liquid inks and aqueous inks.

The liquid ink includes the carbon black of the present invention and further includes a binder resin, a solvent, and a dispersing agent, for example. When a major component of the solvent is an organic solvent, the ink is an organic solvent-type liquid ink, and when a major component of the solvent is an aqueous solvent, such as a water-miscible organic solvent or water, the ink is an aqueous liquid ink.

The liquid ink can be produced as follows: a pigment dispersion is prepared by subjecting a mixture including a pigment and a binder resin to a dispersing operation in a disperser; then, a resin and a solvent are added to the prepared pigment dispersion, and, if necessary, one or more additives, such as a leveling agent, are added thereto; and these are mixed together with stirring. An ink viscosity of the liquid ink may be greater than or equal to 10 mPa·s, which is preferable from the standpoint of preventing the settling of the pigment and properly dispersing the pigment. The ink viscosity may be less than or equal to 1000 mPa·s, which is preferable from the standpoint of operational efficiency for the production of the ink and for printing.

The binder resin is not particularly limited and may be a binder resin typically used in liquid inks. Examples thereof include polyurethane-based resins, acrylic resins, vinyl-chloride-vinyl-acetate-based copolymer resins, vinyl-chloride-acrylic-based copolymer resins, chlorinated polyolefin resins, modified polyolefin resins, celluloses, cellulose derivatives, polyamide resins, ethylene-vinyl acetate copolymer resins, vinyl acetate resins, styrene resins, dammar gum, styrene-maleic acid copolymer resins, polyester resins, alkyd resins, polyvinyl chloride resins, rosin-based resins, rosin-modified maleic acid resins, terpene resins, phenol-modified terpene resins, ketone resins, cyclized rubbers, chlorinated rubbers, butyrals, polyacetal resins, petroleum resins, and modified resins of any of these resins.

Examples of the organic solvent include aromatic hydrocarbon-based organic solvents, such as toluene, xylene, Solvesso #100, and Solvesso #150; aliphatic hydrocarbon-based organic solvents, such as hexane, methylcyclohexane, heptane, octane, and decane; and ester-based solvents, with the ester being methyl acetate, ethyl acetate, isopropyl acetate, n-propyl acetate, butyl acetate, amyl acetate, ethyl formate, butyl propionate, or the like. Examples of the water-miscible organic solvent include alcohol-based solvents, ketone-based solvents, and glycol ether-based solvents. Examples of the alcohol include methanol, ethanol, propanol, butanol, and isopropyl alcohol. Examples of the ketone include acetone, methyl ethyl ketone, and cyclohexanone. Examples of the glycol ether include ethylene glycol mono- or di-methyl ether, ethylene glycol mono- or di-ethyl ether, ethylene glycol monopropyl ether, ethylene glycol monoisopropyl ether, monobutyl ether, diethylene glycol mono- or di-methyl ether, diethylene glycol mono- or di-ethyl ether, diethylene glycol monoisopropyl ether, diethylene glycol monobutyl ether, triethylene glycol mono- or di-methyl ether, propylene glycol mono- or di-methyl ether, propylene glycol monopropyl ether, propylene glycol monobutyl ether, and dipropylene glycol mono- or di-methyl ether.

The ink of the present invention uses the carbon black of the present invention and, in addition, may use one or more coloring agents to an extent in which the effects of the present invention are not impaired. The coloring agents include organic pigments and inorganic pigments that are used in typical inks.

Examples of the organic pigments include azo-based pigments, phthalocyanine-based pigments, halogenated-phthalocyanine-based pigments, anthraquinone-based pigments, anthanthrone-based pigments, dianthraquinonyl-based pigments, anthrapyrimidine-based pigments, perylene-based pigments, perinone-based pigments, quinacridone-based pigments, thioindigo-based pigments, dioxazine-based pigments, isoindolinone-based pigments, quinophthalone-based pigments, azomethine azo-based pigments, flavanthrone-based pigments, diketopyrrolopyrrole-based pigments, isoindoline-based pigments, and indanthrone-based pigments. Examples of the inorganic pigments include white pigments, such as titanium oxide, zinc oxide, zinc sulfide, barium sulfate, calcium carbonate, chromium oxide, silica, lithopone, antimony white, and gypsum.

Examples of inorganic pigments other than white pigments, such as those mentioned above, include aluminum particles, mica (isinglass), bronze powders, chrome vermillion, chrome yellow, cadmium yellow, cadmium red, ultramarine blue, iron blue, red iron oxide, yellow iron oxide, black iron oxide, and zircon.

In addition, if necessary, the ink of the present invention may include one or more additives, examples of which include waxes, chelate-based crosslinking agents, extender pigments, leveling agents, defoaming agents, plasticizing agents, infrared absorbers, UV absorbers, fragrances, and flame retardants.

Furthermore, when the ink of the present invention is an ink jet ink, the ink may include one or more other components in addition to the carbon black of the present invention. Examples of the other components include the above-mentioned organic pigments and inorganic pigments, dyes (e.g., anionic azo dyes, phthalocyanine, and azo-based metal complex salts), resins (e.g., thermoplastic resins, such as acrylic block copolymers, acrylics, maleic acids, rosins, epoxies, silicones, and butyrals), solvents (e.g., water, ketones, alcohols, and ethyl acetate), penetrating agents (e.g., alcohols and glycol ethers), anti-drying agents (e.g., glycerin and glycol), pH-adjusting agents (e.g., alcohol amines and NaOH), surfactants (e.g., nonionic surfactants, cationic surfactants, and anionic surfactants), electrical conductivity-imparting agents, plasticizing agents, antioxidants, UV absorbers, preservatives, and antifungal agents. The ink jet ink may be an aqueous ink or an oil-based ink. Furthermore, the ink jet ink may be a piezoelectric ink or a thermal ink.

[Various Applications Other than Ink Applications]

The carbon black of the present invention has excellent physical properties, including excellent transparency, good dispersibility, and low viscosity, and, therefore, the carbon black can also be suitably used in various applications other than ink applications. Examples of the various applications include those in coating compositions, coloring agents for plastics, coloring agents for stationery and writing instruments, colored molded articles, textile printing agents, toners, dispersions or resists for color filters, and cosmetic compositions. A coating composition, a coloring agent for plastics, a coloring agent for stationery and writing instruments, a textile printing agent, a toner, a dispersion or resist for color filters, and a cosmetic composition, of the present invention, include the carbon black of the present invention.

The coating composition may be any type of coating composition as long as the carbon black of the present invention is included therein as a coloring agent. The coating composition can be used, for example, in synthetic resin coating compositions, examples of the synthetic resin including epoxy resins, urethane resins, fluororesins, polyester resins, melamine resins, silicone resins, and acrylic resins; oil-based coating compositions; aqueous coating compositions; powder coating compositions; and nitrocellulose resin coating compositions (lacquers). Furthermore, the coating composition can be used in any application and for any purpose; for example, uses in woods, metals, rubbers, and plastics are possible.

The coloring agent for plastics may be any type of coloring agent for plastics as long as the carbon black of the present invention is included therein as a coloring agent. The coloring agent for plastics can be used, for example, in masterbatches, colored pellets and compounds, dry colors, color pastes, and liquid masterbatches. The colored molded article is an article molded from a resin including the coloring agent for plastics.

The coloring agent for stationery and writing instruments may be any type of coloring agent for stationery and writing instruments as long as the carbon black of the present invention is included therein as a coloring agent. The coloring agent for stationery and writing instruments can be used, for example, in ballpoint pens, markers, colored pencils, paints, and crayons.

The textile printing agent may be any type of textile printing agent that can be printed by any process, as long as the carbon black of the present invention is included therein as a coloring agent. The textile printing agent can be used in textile printing agents for printing processes such as manual printing (hand printing, turn table), automatic printing (flat screen, rotary screen), and dip dyeing. Furthermore, the textile printing agent is not limited to the foregoing uses and can be used for directly coloring the raw materials (e.g., dopes, solutions, and polymers) of chemical fibers (such coloring is called "dope dyeing").

The toner may be any toner as long as the carbon black of the present invention is included therein as a coloring agent. The toner is used in laser printers and copy machines (particularly for a magenta or yellow color for color printing).

Dispersions or resists for color filters are dispersions in which a pigment for use in color filters for liquid crystals or the like is used as a base and dispersed in a solvent or are inks including such a dispersion, a sensitizer, and the like. The above-mentioned dispersion or resist for color filters includes, as the pigment, the carbon black of the present invention.

The cosmetic composition may be any type of cosmetic composition that can be used in any application and for any purpose, as long as the carbon black of the present invention is included therein as a coloring agent. Examples of the cosmetic composition include foundations (e.g., color foundations and concealers), makeup primers (e.g., makeup bases and pre-makeup), white powders (face powders), lip cosmetics (e.g., lipsticks, lip rouges, lip colors, lip pencils, rouges, lip glosses, and lip liners), eye makeups (e.g., eye shadows, eye colors, eye liners, pencils for shaping eyebrows, eyebrow pencils, eyebrow brushes, mascaras, and eyelash cosmetics), cheek cosmetics (e.g., blushers, cheek colors, and cheek rouges), nail cosmetics (e.g., nail enamels, manicure cosmetics, nail colors, nail polishes, pedicure cosmetics, nail lacquers, top coats, and base coats), and hair color formulations (e.g., hair dyes, hair color spray, hair color sticks, color rinses, and hair manicures).

EXAMPLES

The present invention will now be described in more detail with reference to Examples and Comparative Examples. Regarding the Examples and the Comparative Examples described below, "%" means "mass %" unless otherwise specified. Carbon blacks were prepared in the respective manners of Examples 1 to 6 and Comparative Examples 1 to 6 described below. The amount of iron element present in the carbon black and the concentrations of the elements on the surface were measured with the methods described below.

In the present examples, the amount of iron element present in the carbon black was measured with an energy dispersive X-ray fluorescence analyzer PANalytical Epsilon 5 (manufactured by Spectris Co., Ltd.).

In the present examples, the concentrations of the elements on the surface of the particles of the carbon black were measured with an XPS method (X-ray photoelectron spectroscopy). The measurement was carried out with an X-ray photoelectron spectrometer Quantera SXM (manufactured by Ulvac-Phi, Inc.). Note that the values of the concentrations of the elements were rounded to two significant FIGURES.

[Measurement Conditions]

X-ray source: AlKa (monochromator)
Measurement: point measurement (100 μm), surface
Number of measurements performed: 3
Charge correction: C1s=284.8 eV (Example 1) [Synthesis of CB-1]

150 parts of carbon black-A (particle size: 47 nm, DBP oil absorption: 47 $cm^3$/100 g, nitrogen adsorption specific surface area: 48 $m^2$/g, pH: 3.1) was added to 500 parts of water, and the resultant was stirred for 1 hour to wet the carbon black. Next, 2350 parts of water was added, and the resultant was stirred for 1 hour. Subsequently, 6.84 parts of iron (II) sulfate heptahydrate was added, and the resultant was stirred for another 30 minutes. 214.3 parts of 35% hydrogen peroxide was added to the resultant, which was stirred for 1 hour, and then 1.71 parts of iron (II) sulfate heptahydrate was added to the resultant, which was stirred for 1 hour. Subsequently, the carbon black slurry was filtered, washed with water, dried at 98° C. for about 24 hours, and ground to give carbon black-1 (CB-1). In CB-1, the amount of iron element was 8590 ppm (0.8590%); the concentration Fe of iron element on a surface of the particles of the carbon black was 0.4 atomic %, and the concentration C of elemental carbon on the surface of the particles of the carbon black was 97.1 atomic %, as determined by X-ray photoelectron spectroscopy; and the ratio of Fe/C was 0.0041.

(Example 2) [Synthesis of CB-2]

Carbon black-2 (CB-2) was prepared by performing an operation similar to that of Example 1, except that carbon black-A was replaced with carbon black-B (particle size: 47 nm, DBP oil absorption: 69 $cm^3$/100 g, nitrogen adsorption specific surface area: 55 $m^2$/g, pH: 8.0). In CB-2, the amount of iron element was 10930 ppm (1.0930%); the concentration Fe of iron element on a surface of the particles of the carbon black was 0.4 atomic %, and the concentration C of elemental carbon on the surface of the particles of the carbon black was 94.4 atomic %, as determined by X-ray photoelectron spectroscopy; and the ratio of Fe/C was 0.0042.

(Example 3) [Synthesis of CB-3]

Carbon black-3 (CB-3) was prepared by performing an operation similar to that of Example 1, except that carbon black-A was replaced with carbon black-C (particle size: 38 nm, DBP oil absorption: 65 $cm^3$/100 g, nitrogen adsorption specific surface area: 46 $m^2$/g, pH: neutral). In CB-3, the amount of iron element was 12230 ppm (1.2230%); the concentration Fe of iron element on a surface of the particles of the carbon black was 0.3 atomic %, and the concentration C of elemental carbon on the surface of the particles of the carbon black was 94.3 atomic %, as determined by X-ray photoelectron spectroscopy; and the ratio of Fe/C was 0.0032.

(Example 4) [Synthesis of CB-4]

Carbon black-4 (CB-4) was prepared by performing an operation similar to that of Example 1, except that carbon black-A was replaced with carbon black-D (particle size: 75 nm, DBP oil absorption: 72 $cm^3$/100 g, nitrogen adsorption specific surface area: 25 $m^2$/g, pH: neutral). In CB-4, the amount of iron element was 10630 ppm (1.0630%); the concentration Fe of iron element on a surface of the particles of the carbon black was 0.4 atomic %, and the concentration C of elemental carbon on the surface of the particles of the carbon black was 93.1 atomic %, as determined by X-ray photoelectron spectroscopy; and the ratio of Fe/C was 0.0043.

(Example 5) [Synthesis of CB-5]

Carbon black-5 (CB-5) was prepared by performing an operation similar to that of Example 1, except that carbon black-A was replaced with carbon black-E (particle size: 31 nm, DBP oil absorption: 44 $cm^3$/100 g, nitrogen adsorption specific surface area: 62 $m^2$/g, pH: 3.6). In CB-5, the amount of iron element was 12410 ppm (1.2410%); the concentration Fe of iron element on a surface of the particles of the carbon black was 0.4 atomic %, and the concentration C of elemental carbon on the surface of the particles of the carbon black was 95.5 atomic %, as determined by X-ray photoelectron spectroscopy; and the ratio of Fe/C was 0.0042.

(Example 6) [Synthesis of CB-6]

Carbon black-6 (CB-6) was prepared by performing an operation similar to that of Example 1, except that carbon black-A was replaced with carbon black-F (particle size: 25 nm, DBP oil absorption: 115 $cm^3$/100 g, nitrogen adsorption specific surface area: 180 $m^2$/g, pH: 3.0). In CB-6, the amount of iron element was 10150 ppm (1.0150%); the concentration Fe of iron element on a surface of the particles of the carbon black was 0.4 atomic %, and the concentration C of elemental carbon on the surface of the particles of the carbon black was 95.2 atomic %, as determined by X-ray photoelectron spectroscopy; and the ratio of Fe/C was 0.0042.

(Comparative Example 1) [Synthesis of CB-1']

150 parts of carbon black-A was added to 500 parts of water, and the resultant was stirred for 1 hour to wet the carbon black. Next, 2350 parts of water was added, and the resultant was stirred for 3 hours. Subsequently, the carbon black slurry was filtered, washed with water, dried at 98° C. for about 24 hours, and ground to give carbon black-1' (CB-1'). In CB-1', the amount of iron element was 4 ppm; the concentration Fe of iron element on a surface of the particles of the carbon black was 0.0 atomic %, and the concentration C of elemental carbon on the surface of the particles of the carbon black was 98.4 atomic %, as determined by X-ray photoelectron spectroscopy; and the ratio of Fe/C was 0.00.

(Comparative Example 2) [Synthesis of CB-2']

Carbon black-2' (CB-2') was prepared by performing an operation similar to that of Comparative Example 1, except that carbon black-A was replaced with carbon black-B. In CB-2', the amount of iron element was 6 ppm; the concentration Fe of iron element on a surface of the particles of the carbon black was 0.0 atomic %, and the concentration C of elemental carbon on the surface of the particles of the carbon black was 98.4 atomic %, as determined by X-ray photoelectron spectroscopy; and the ratio of Fe/C was 0.00.

(Comparative Example 3) [Synthesis of CB-3']

Carbon black-3' (CB-3') was prepared by performing an operation similar to that of Comparative Example 1, except that carbon black-A was replaced with carbon black-C. In CB-3', the amount of iron element was 9 ppm; the concentration Fe of iron element on a surface of the particles of the carbon black was 0.0 atomic %, and the concentration C of elemental carbon on the surface of the particles of the carbon black was 98.3 atomic %, as determined by X-ray photoelectron spectroscopy; and the ratio of Fe/C was 0.00.

(Comparative Example 4) [Synthesis of CB-4']

Carbon black-4' (CB-4') was prepared by performing an operation similar to that of Comparative Example 1, except that carbon black-A was replaced with carbon black-D. In CB-4', the amount of iron element was 26 ppm; the concentration Fe of iron element on a surface of the particles of the carbon black was 0.0 atomic %, and the concentration C of elemental carbon on the surface of the particles of the carbon black was 98.0 atomic %, as determined by X-ray photoelectron spectroscopy; and the ratio of Fe/C was 0.00.

(Comparative Example 5) [Synthesis of CB-5']

Carbon black-5' (CB-5') was prepared by performing an operation similar to that of Comparative Example 1, except that carbon black-A was replaced with carbon black-E. In CB-5', the amount of iron element was 8 ppm; the concentration Fe of iron element on a surface of the particles of the carbon black was 0.0 atomic %, and the concentration C of elemental carbon on the surface of the particles of the carbon black was 98.2 atomic %, as determined by X-ray photoelectron spectroscopy; and the ratio of Fe/C was 0.00.

(Comparative Example 6) [Synthesis of CB-6']

Carbon black-6' (CB-6') was prepared by performing an operation similar to that of Comparative Example 1, except that carbon black-A was replaced with carbon black-F. In CB-6', the amount of iron element was 9 ppm; the concentration Fe of iron element on a surface of the particles of the carbon black was 0.0 atomic %, and the concentration C of elemental carbon on the surface of the particles of the carbon black was 95.2 atomic %, as determined by X-ray photoelectron spectroscopy; and the ratio of Fe/C was 0.00.

[Preparation of Polyurethane Inks]

Polyurethane inks including the respective carbon blacks obtained in Examples 1 to 6 and Comparative Examples 1 to 6 were prepared in the following manner. 15 g of the carbon black, 30 g of a polyurethane resin Sanprene IB-501 (manufactured by Sanyo Chemical Industries, Ltd.), 19.5 g of ethyl acetate, 10.5 g of isopropyl alcohol, and 180 g of ⅛-inch steel beads (manufactured by Mochiki Steel Ball & Bearing Co., Ltd.) were added to a 250-mL polyethylene jar. The contents were dispersed with a paint shaker (manufactured by Toyo Seiki Seisaku-sho, Ltd.) for 30 minutes.

(Measurement of Initial Viscosity of Polyurethane Inks)

The prepared polyurethane inks were left to stand in a constant-temperature oven at 20° C. for 1 hour or more. Thereafter, a viscosity of the polyurethane inks was measured at a rotational speed of 6 rpm with a Model R85 viscometer RB85L (manufactured by Toki Sangyo Co., Ltd.).

(Measurement of Storage Viscosity of Polyurethane Inks)

The prepared polyurethane inks were left to stand in a multiple safety dryer MSO-45TPH (manufactured by Futaba Kagaku Co., Ltd.) at 50° C. for 7 days and subsequently left to stand in a constant-temperature oven at 20° C. for 1 hour or more. Thereafter, a storage viscosity of the polyurethane inks was measured at a rotational speed of 60 rpm with a Model R85 viscometer RB85L (manufactured by Toki Sangyo Co., Ltd.).

(Determination of Dispersion Stability)

A rate of viscosity change was calculated by substituting, into the following equation, the values obtained in the initial viscosity measurement and the storage viscosity measurement of the polyurethane inks. Smaller absolute values of the rate of viscosity change indicate higher dispersion stabilities.

$$(\text{Value of storage viscosity}-\text{Value of initial viscosity})/\text{Value of initial viscosity}\times 100=\text{Rate of viscosity change }(\%)$$

In Table 1, the dispersion stability was rated on a three-point scale of A, B, and C, as shown below.

A: −100%<rate of viscosity change<+100%

B: −200%<rate of viscosity change≤−100%, or +100%≤rate of viscosity change<+200%

C: rate of viscosity change≤−200%, or rate of viscosity change≥+200% or more (Measurement of Nitrogen Adsorption Specific Surface Area (BET))

The nitrogen adsorption specific surface area (BET) was measured as follows. Approximately 200 mg of the carbon black was used. The measurement of the amount of gas adsorption was performed with a single-point method in a full automatic specific surface area analyzer Macsorb HM model-1208 (manufactured by Mountech Co., Ltd.).

(Measurement of Acid and Base Adsorption Capacities)

The acid adsorption amount per weight and per surface area were measured in the following manner. Approximately 100 mg of the carbon black and 15 mL of an acid solution for adsorption were weighed into a 50-mL polyethylene jar and then mixed together with stirring (750 cpm, 15 minutes) with a paint shaker (manufactured by Toyo Seiki Seisaku-sho, Ltd.). Subsequently, the mixture was centrifuged (3500 G, 20 minutes) in a high-speed refrigerated centrifuge H-2000B (manufactured by Kokusan Co., Ltd.) to settle the carbon black. Subsequently, 10 mL of the supernatant liquid was collected. The supernatant liquid was diluted with 15 mL of n-propyl acetate (manufactured by Kanto Chemical Co., Inc.) and then subjected to potentiometric titration in an automatic titrator COM-A19 (manufactured by Hiranuma Co., Ltd.). The potentiometric titration was performed with a base solution for adsorption to measure an amount of unadsorbed acid present in the supernatant solution. The determined amount of unadsorbed acid was subtracted from the amount of acid that was added. In this manner, the acid adsorption amount per weight of the carbon black was calculated. Furthermore, the acid adsorption amount per surface area of the carbon black was calculated by dividing the acid adsorption amount per weight by the nitrogen adsorption specific surface area.

The base adsorption capacities per weight and per surface area were measured by performing an operation similar to that of the measurement of the acid adsorption amount, with the difference being that an acid solution for adsorption and a base solution for adsorption were used in a reverse manner. The base solution for adsorption was prepared by diluting a 0.1 mol/L tetra-n-butylammonium hydroxide solution (N/10) (benzene-methanol solution) (manufactured by Kanto Chemical Co., Inc.), which had a known titer, with n-propyl acetate (manufactured by Kanto Chemical Co., Inc.), at a ratio of 1:100 exactly. The acid solution for adsorption was prepared by dissolving approximately 95 mg of p-toluenesulfonic acid monohydrate (manufactured by Kanto Chemical Co., Inc.) in 500 mL of n-propyl acetate (manufactured by Kanto Chemical Co., Inc.). Before use, the concentration of the acid solution for adsorption was determined by titration, which was performed with the base solution for adsorption.

Table 1 shows the initial viscosity, the storage viscosity, the rate of viscosity change, and the dispersion stability rating of each of the prepared polyurethane inks.

TABLE 1

| | CB in polyurethane ink | Initial viscosity (mPa · s) | Storage viscosity (mPa · s) | Rate of viscosity change (%) | Dispersion stability |
|---|---|---|---|---|---|
| Comparative Example 1 | CB-1' | 58 | 165 | +184 | B |
| Example 1 | CB-1 | 63 | 51 | −19 | A |
| Comparative Example 2 | CB-2' | 145 | 20700 | +14176 | B |
| Example 2 | CB-2 | 69 | 65 | −6 | A |
| Comparative Example 3 | CB-3' | 125 | 420 | +236 | C |
| Example 3 | CB-3 | 87 | 74 | −15 | A |
| Comparative Example 4 | CB-4' | 46 | 120 | +161 | B |
| Example 4 | CB-4 | 60 | 51 | −15 | A |
| Comparative Example 5 | CB-5' | 120 | 32500 | +26983 | C |
| Example 5 | CB-5 | 95 | 95 | 0 | A |
| Comparative Example 6 | CB-6' | 300 | 60300 | +20000 | C |
| Example 6 | CB-6 | 360 | 640 | +78 | A |

As is apparent from Table 1, the inks of Examples 1 to 6, which included the carbon black of the present invention, had low storage viscosity and excellent dispersion stability compared with the carbon blacks that are known in the related art. Accordingly, the carbon black of the present invention is suitable as an ink.

Table 2 shows the nitrogen adsorption specific surface area (BET) and the acid and base adsorption capacities per weight and per surface area of the carbon black of the present invention included in each of the prepared polyurethane inks.

TABLE 2

| | CB in polyurethane ink | BET ($m^2/g$) | Acid adsorption amount per weight (μmol/g) | Base adsorption amount per weight (μmol/g) | Acid adsorption amount per surface area (μmol/$m^2$) | Base adsorption amount per surface area (μmol/$m^2$) |
|---|---|---|---|---|---|---|
| Comparative Example 1 | CB-1' | 48 | 4.9 | 18.5 | 0.10 | 0.38 |
| Example 1 | CB-1 | 50 | 21.5 | 34.6 | 0.43 | 0.69 |
| Comparative Example 2 | CB-2' | 50 | 11.8 | 0.1 | 0.24 | 0.00 |
| Example 2 | CB-2 | 55 | 27.1 | 28.7 | 0.49 | 0.52 |
| Comparative Example 3 | CB-3' | 53 | 5.0 | 1.0 | 0.09 | 0.02 |
| Example 3 | CB-3 | 60 | 24.1 | 40.0 | 0.40 | 0.67 |
| Comparative Example 4 | CB-4' | 31 | 3.2 | 0.0 | 0.10 | 0.00 |
| Example 4 | CB-4 | 34 | 14.0 | 30.2 | 0.41 | 0.88 |
| Comparative Example 5 | CB-5' | 64 | 23.9 | 14.8 | 0.37 | 0.23 |
| Example 5 | CB-5 | 66 | 48.9 | 34.5 | 0.74 | 0.52 |
| Comparative Example 6 | CB-6' | 153 | 3.2 | 116.7 | 0.02 | 0.76 |
| Example 6 | CB-6 | 128 | 51.0 | 124.0 | 0.40 | 0.97 |

The invention claimed is:

1. A carbon black comprising iron element in an amount of 0.01 to 2.00 parts by mass per 100 parts by mass of the carbon black, wherein a ratio of Fe/C is 0.003 to 0.006, where Fe is a concentration in atomic % of the iron element on a surface of particles of the carbon black, and Cis a concentration in atomic % of elemental carbon on the surface of the particles of the carbon black, as determined by X-ray photoelectron spectroscopy, wherein the carbon black has an acid adsorption amount per surface area of 0.40 umol/$m^2$ or greater.

2. The carbon black according to claim 1, wherein the carbon black has an acid adsorption amount per surface area of 0.42 to 1.0 umol/$m^2$.

3. The carbon black according to claim 1, wherein the iron element is present on a surface of aggregates of the carbon black, and the iron element is in the form of an iron oxide or an iron oxyhydroxide, the carbon black being obtained by adding an iron compound and an oxidizing agent to a slurry containing the carbon black and stirring.

4. The carbon black according to claim 1, wherein the carbon black has a base adsorption capacity per surface area of 0.30 umol/$m^2$ or greater.

5. An ink comprising the carbon black according to claim 1.

6. A coating composition comprising the carbon black according to claim 1.

7. A coloring agent for a plastic comprising the carbon black according to claim 1.

8. A colored molded article comprising the carbon black according to claim 1.

9. A coloring agent for stationery and a writing instrument comprising the carbon black according to claim 1.

10. A textile printing agent comprising the carbon black according to claim 1.

11. A toner comprising the carbon black according to claim 1.

12. A dispersion or resist for a color filter comprising the carbon black according to claim 1.

13. A cosmetic composition comprising the carbon black according to claim 1.

* * * * *